(12) United States Patent
Oyman

(10) Patent No.: US 11,388,700 B2
(45) Date of Patent: Jul. 12, 2022

(54) INTERNET PROTOCOL (IP) MULTIMEDIA SUBSYSTEM (IMS) BASED PEER-TO-PEER (P2P) CONTENT DISTRIBUTION

(71) Applicant: Apple Inc., Cupertino, CA (US)

(72) Inventor: Ozgur Oyman, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 35 days.

(21) Appl. No.: 14/776,625

(22) PCT Filed: Dec. 24, 2013

(86) PCT No.: PCT/US2013/077636
§ 371 (c)(1),
(2) Date: Sep. 14, 2015

(87) PCT Pub. No.: WO2014/163691
PCT Pub. Date: Oct. 9, 2014

(65) Prior Publication Data
US 2016/0044099 A1    Feb. 11, 2016

Related U.S. Application Data

(60) Provisional application No. 61/808,597, filed on Apr. 4, 2013.

(51) Int. Cl.
*G06F 15/16* (2006.01)
*H04W 72/04* (2009.01)
(Continued)

(52) U.S. Cl.
CPC .......... *H04W 72/0413* (2013.01); *H04B 1/38* (2013.01); *H04B 7/024* (2013.01);
(Continued)

(58) Field of Classification Search
CPC ............... H04W 72/0413; H04L 67/00; H04L 65/1016; H04L 67/104; H04L 65/1006;
(Continued)

(56) References Cited

U.S. PATENT DOCUMENTS

2006/0165083 A1* 7/2006 Lee .................... H04L 29/12584
370/392
2007/0121608 A1   5/2007 Gu et al.
(Continued)

FOREIGN PATENT DOCUMENTS

| CN | 101115019 A | 1/2008 |
|----|-------------|--------|
| CN | 101132340 A | 2/2008 |

(Continued)

OTHER PUBLICATIONS

Jinghua Lin, Dong Yu, Bo Yu and Shiquan Xiao, "An IMS-based manageable P2P live streaming system in NGN," 2010 3rd IEEE International Conference on Broadband Network and Multimedia Technology (IC-BNMT), Beijing, 2010, pp. 750-756 (Year: 2010).*
(Continued)

*Primary Examiner* — Jeffrey R Swearingen
*Assistant Examiner* — Messeret F Gebre

(57) ABSTRACT

Technology for providing peer-to-peer (P2P) content distribution via a P2P applications server is disclosed. In an example, service control function (SCF) module can be operable for P2P content distribution and include computer circuitry configured to host P2P applications server operable to manage Internet protocol (IP) multimedia subsystem (IMS) content distribution between two user equipments (UEs).

24 Claims, 10 Drawing Sheets

(51) Int. Cl.
| | |
|---|---|
| H04W 4/70 | (2018.01) |
| H04W 76/38 | (2018.01) |
| H04W 76/22 | (2018.01) |
| H04W 76/12 | (2018.01) |
| H04L 5/00 | (2006.01) |
| H04W 36/00 | (2009.01) |
| H04L 65/1016 | (2022.01) |
| H04B 7/024 | (2017.01) |
| H04W 24/02 | (2009.01) |
| H04W 74/08 | (2009.01) |
| H04W 36/30 | (2009.01) |
| H04B 1/38 | (2015.01) |
| H04W 76/00 | (2018.01) |
| H04W 24/08 | (2009.01) |
| H04L 43/0823 | (2022.01) |
| H04W 68/02 | (2009.01) |
| H04L 12/18 | (2006.01) |
| H04L 65/611 | (2022.01) |
| H04L 65/613 | (2022.01) |
| H04L 67/02 | (2022.01) |
| H04L 67/1074 | (2022.01) |
| H04W 8/00 | (2009.01) |
| H04W 56/00 | (2009.01) |
| H04W 72/12 | (2009.01) |
| H04L 5/14 | (2006.01) |
| H04L 1/18 | (2006.01) |
| H04W 76/15 | (2018.01) |
| H04W 76/28 | (2018.01) |
| H04W 76/30 | (2018.01) |
| H04W 76/27 | (2018.01) |
| H04W 76/10 | (2018.01) |
| H04W 76/11 | (2018.01) |
| H04B 7/0456 | (2017.01) |
| H04B 7/06 | (2006.01) |
| H04W 36/38 | (2009.01) |
| H04W 36/14 | (2009.01) |
| H04W 36/36 | (2009.01) |
| H04L 65/1045 | (2022.01) |
| H04W 88/06 | (2009.01) |
| H04W 84/12 | (2009.01) |
| H04W 84/04 | (2009.01) |
| H04W 88/02 | (2009.01) |
| H04L 65/10 | (2022.01) |
| H04W 92/20 | (2009.01) |
| H04W 88/08 | (2009.01) |
| H04W 76/20 | (2018.01) |

(52) U.S. Cl.
CPC .......... *H04L 1/1854* (2013.01); *H04L 5/0053* (2013.01); *H04L 5/0055* (2013.01); *H04L 5/0094* (2013.01); *H04L 5/14* (2013.01); *H04L 12/18* (2013.01); *H04L 43/0823* (2013.01); *H04L 65/1016* (2013.01); *H04L 65/4076* (2013.01); *H04L 65/4092* (2013.01); *H04L 67/02* (2013.01); *H04L 67/1076* (2013.01); *H04W 4/70* (2018.02); *H04W 8/005* (2013.01); *H04W 24/02* (2013.01); *H04W 24/08* (2013.01); *H04W 36/0088* (2013.01); *H04W 36/0094* (2013.01); *H04W 36/30* (2013.01); *H04W 56/001* (2013.01); *H04W 68/02* (2013.01); *H04W 72/042* (2013.01); *H04W 72/048* (2013.01); *H04W 72/0446* (2013.01); *H04W 72/0486* (2013.01); *H04W 72/1215* (2013.01); *H04W 72/1263* (2013.01); *H04W 74/0808* (2013.01); *H04W 76/00* (2013.01); *H04W 76/10* (2018.02); *H04W 76/11* (2018.02); *H04W 76/12* (2018.02); *H04W 76/15* (2018.02); *H04W 76/22* (2018.02); *H04W 76/27* (2018.02); *H04W 76/28* (2018.02); *H04W 76/30* (2018.02); *H04W 76/38* (2018.02); *H04B 7/0456* (2013.01); *H04B 7/0639* (2013.01); *H04L 5/0007* (2013.01); *H04L 65/105* (2013.01); *H04L 65/1006* (2013.01); *H04W 36/14* (2013.01); *H04W 36/36* (2013.01); *H04W 36/38* (2013.01); *H04W 76/20* (2018.02); *H04W 84/045* (2013.01); *H04W 84/12* (2013.01); *H04W 88/02* (2013.01); *H04W 88/06* (2013.01); *H04W 88/08* (2013.01); *H04W 92/20* (2013.01); *Y02D 30/70* (2020.08)

(58) Field of Classification Search
CPC . H04L 12/18; H04L 65/4076; H04L 65/4092; H04L 67/02; H04L 67/1076
USPC .......................................................... 709/219
See application file for complete search history.

(56) References Cited

U.S. PATENT DOCUMENTS

| | | | |
|---|---|---|---|
| 2007/0237139 | A1* | 10/2007 | Garcia-Martin ............................ H04L 29/06027 370/389 |
| 2008/0109853 | A1 | 5/2008 | Einarsson et al. |
| 2009/0005056 | A1 | 1/2009 | Gonsa et al. |
| 2009/0052364 | A1* | 2/2009 | Gonsa ................... H04L 12/189 370/312 |
| 2009/0316615 | A1 | 12/2009 | Vedantham et al. |
| 2010/0142517 | A1 | 6/2010 | Montemurro et al. |
| 2010/0211689 | A1 | 8/2010 | Bijwaard et al. |
| 2011/0010459 | A1 | 1/2011 | Stokking et al. |
| 2011/0307581 | A1* | 12/2011 | Furbeck .................. H04L 67/34 709/219 |
| 2012/0072592 | A1* | 3/2012 | Lidstrom ................ H04L 47/20 709/224 |
| 2012/0110120 | A1* | 5/2012 | Willig ................ H04L 65/1016 709/217 |
| 2013/0007186 | A1* | 1/2013 | Liu ...................... H04L 67/1008 709/213 |
| 2013/0021998 | A1* | 1/2013 | Shatsky ................ H04W 28/26 370/329 |
| 2013/0212166 | A1* | 8/2013 | Willig ................ H04L 65/1016 709/203 |
| 2013/0291040 | A1 | 10/2013 | Rhyu et al. |
| 2014/0173677 | A1 | 6/2014 | Lohmar et al. |
| 2014/0195607 | A1* | 7/2014 | Kowalewski ........... H04L 67/06 709/204 |
| 2014/0289627 | A1* | 9/2014 | Brockmann ..... H04N 21/23412 715/719 |
| 2015/0172348 | A1* | 6/2015 | Lohmar ................ H04L 65/607 709/219 |

FOREIGN PATENT DOCUMENTS

| | | |
|---|---|---|
| CN | 103026680 A | 4/2013 |
| CN | 103748810 A | 4/2014 |
| JP | 2009/533925 A | 9/2009 |
| JP | 2011/508491 A | 3/2011 |
| JP | 2011521369 A | 7/2011 |
| JP | 2012/523158 A | 9/2012 |
| JP | 2013/506384 A | 2/2013 |
| JP | 2014/505448 A | 2/2014 |
| KR | 10-2004-0044216 A1 | 5/2004 |
| WO | WO 2007/101473 A1 | 9/2007 |
| WO | WO 2008/141087 A1 | 11/2008 |
| WO | WO 2010/094322 A1 | 8/2010 |
| WO | WO 2010/114475 A2 | 10/2010 |

(56) References Cited

FOREIGN PATENT DOCUMENTS

| WO | WO 2012/059376 A1 | 5/2012 |
|----|-------------------|--------|
| WO | WO 2013/003793 A1 | 1/2013 |
| WO | WO 2013/019267 A1 | 2/2013 |
| WO | WO 2013/022470 A1 | 2/2013 |
| WO | WO 2013/112479 A1 | 8/2013 |

OTHER PUBLICATIONS

G. Hassligner, "Cross-Layer Aspects of Peer-to-Peer Overlays on IP Platforms of Network Providers," 2008 Eighth International Conference on Peer-to-Peer Computing, 2008, pp. 173-176. (Year: 2008).*

Hayakawa, A., Asahara, M., Kono, K., & Kojima, T. (2010). A strategy for efficient update propagation on peer-to-peer based content distribution networks. IPSJ Online Transactions, 3, 110-24. (Year: 2010).*

X. Chen and S. Lian, "Research on Secure Digital Content Distribution for Peer to Peer E-commerce Applications," 2009 International Conference on Multimedia Information Networking and Security, 2009, pp. 463-467. (Year: 2009).*

Lin et al., "An IMS-Based Manageable P2P Live Streaming System in NGN", Broadband Network and Multimedia Technology (IC-MNMT), 3$^{rd}$ IEEE International Conference, Oct. 2010, p. 750-756, (9 pages).

Lin et al., "IMS-based P2P Streaming Service System", Computer Application and System Modeling (ICCASM 2010), International Conference, Oct. 2010, p. V4-61-V4-66, (8 pages).

Poikselka et al., "The IMS—IP Multimedia Concepts and Services in the Mobile Domain", Jan. 2, 2004, (450 pages).

Extended European Search Report for PCT Patent Application No. PCT/US2013/077636, dated Apr. 26, 2017, (15 pages).

3rd Generation Partnership Project; Technical Specification Group Services and System Aspects; Transparent end-to-end Packet-switched Streaming Service {PSS); Protocols and codecs (Release 9) 3GPP TS 26.234 V9.9.0 {Jun. 2012) 188 Pages.

3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 11) 3GPP TS 26.237 V11.0.0 (Jun. 2012) 142 Pages.

3rd Generation Partnership Project; Technical Specification Group Services and System Aspects; Transparent end-to-end Packet-switched Streaming Service {PSS); Progressive Download and Dynamic Adaptive Streaming over HTIP (3GP-DASH) (Release 11) 3GPP TS 26.247 V11.0.0 (Sep. 2012), 112 Pages.

3rd Generation Partnership Project; Technical Specification Group Services and System Aspects; Multimedia Broadcast/Multicast Service {MBMS); Protocols and codecs (Release 9) 3GPP TS 26.346 V9.8.0 (Sep. 2012), 154 Pages.

3rd Generation Partnership Project; Technical Specification Group Services and System Aspects; Study on IMS based peer-to-peer content distribution services (Release 11), 3GPP TR 22.906 V11.0.0 (Jun. 2010), 15 Pages.

Intel Corp Ltd, "Discussion Paper on Combining MBMS Download and HTTP-based Delivery of DASH Content", 3GPP TSG-SA4 S4-110946, Nov. 2011, Meeting 66, Agenda 7, 5 pages, Jeju, Korea.

Intel Corp Ltd, "Discussion Paper on Procedures for MBMS File Repair via Conventional HTTP Servers in IMS Networks", 3GPP TSG-SA4 S4-120097, Jan./Feb. 2012, Meeting 67, Agenda 7, 4 pages, Edinburgh, UK.

ISO/IEC JTC 1/SC 29, "Information Technology-Dynamic Adaptive Streaming Over HTTPP (DASH)—Part 1: Media Presentation Description and Segment Formats", ISO/IEC 23009-1:2012(E), Jan. 2012, pp. 133, Geneva.

PCT Patent Application No. PCT/US11/65586 filed Dec. 16, 2011, Ozgur Oyman.

TS 26.237 V1 0.2.0, I P Multimedia Subsystem (IMS) based Packet Switch Streaming (PSS) and Multimedia Broadcast/Multicast Service (MBMS) User Service Protocols, Jun. 2011.

TS 26.346 V11.1.0, Multimedia Broadcast/Multicast Service (MBMS); Protocols and codecs, Jun. 2012.

U.S. Appl. No. 13/613,902, filed Sep. 13, 2012, Ozgur Oyman.

France Telecom; "IMS Based HTTP Adaptive Streaming;" 3GPP Tdoc S4-100622; (Aug. 16-20, 2010); 12 pages; TSG-SA4#60, Erlanguen, Germany; (Agenda 7).

Hautakorpi et al.; "Interconnecting P2PSIP and IMS;" In: IEEE Next Generation Mobile Applications, Services, and Technologies, 2$^{nd}$ International Conference; (Sep. 16-19, 2008); 7 pages; IEEE; Cardiff, UK; <doi: 10.1109/NGMAST.2008.60 >.

Poikselkä et al.; " The IMS-IP Multimedia Concepts and Services in the Mobile Domain"; (Jan. 2, 2004); pp. 191-193, 384-386; <ISBN: 0-470-87113-X>.

* cited by examiner

INTERNET PROTOCOL (IP) MULTIMEDIA SUBSYSTEM (IMS) BASED PEER-TO-PEER (P2P) CONTENT DISTRIBUTION

RELATED APPLICATIONS

This application claims the benefit of and hereby incorporates by reference U.S. Provisional Patent Application Ser. No. 61/808,597, filed Apr. 4, 2013.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
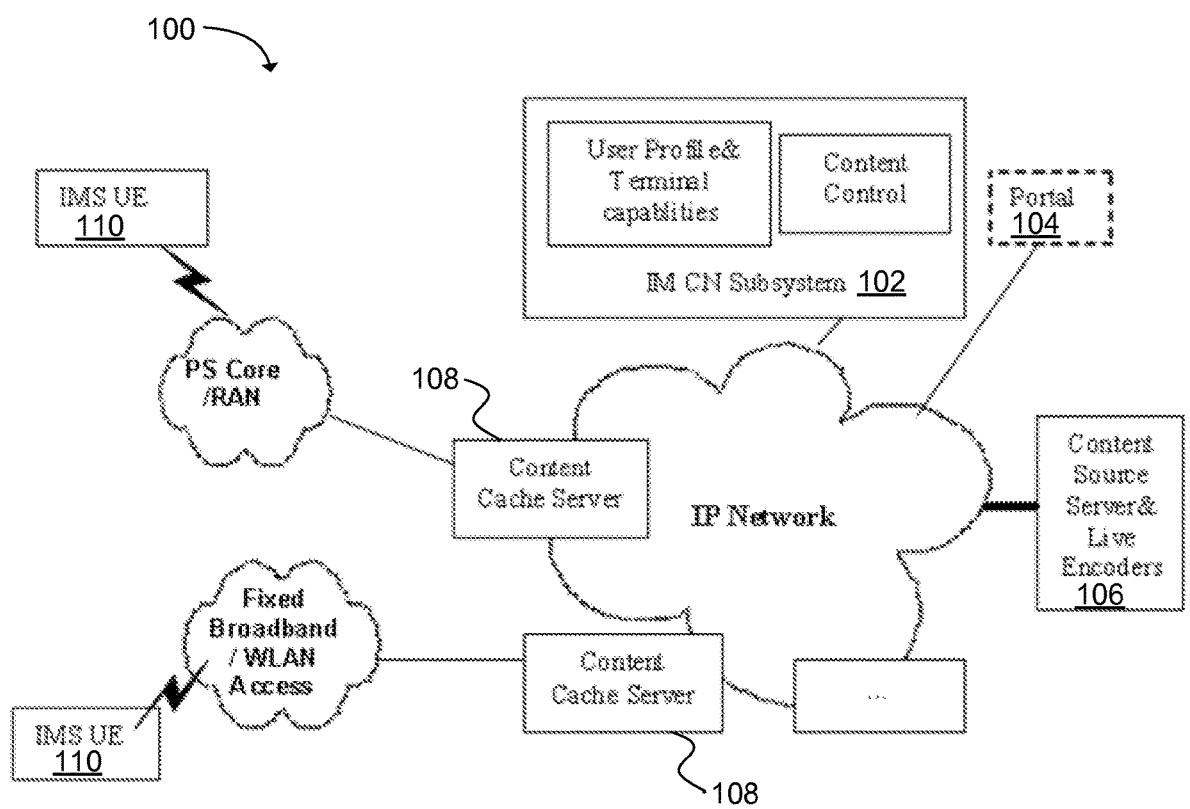
FIG. 1 illustrates a block diagram of an internet protocol (IP) multimedia subsystem (IMS) based peer to peer (P2P) content distribution system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

Dynamic adaptive streaming over HTTP (DASH) is a multimedia streaming technology where a multimedia file can be partitioned into one or more segments and delivered to a client using HTTP. DASH can be a standardized HTTP streaming protocol. In an example, DASH can be standardized in 3GPP technical specification (TS) 26.247 V11.1.0 (2012 December). DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different representations, including bit rate or encoding type, of the media content as the available bandwidth changes. Thus, DASH can allow for fast adaptation to changing network and wireless link conditions, user preferences and device capabilities, such as display resolution, the type of central processing unit (CPU) employed, or memory resources available. The dynamic adaptation of DASH can provide a better quality of experience (QoE) for a user, with shorter startup delays and fewer rebuffering events.

The internet protocol (IP) multimedia subsystem (IMS) or IP multimedia core network subsystem (IM CN) is an architectural framework in 3GPP for delivering IP multimedia services, such as DASH content. The IP multimedia core network subsystem can be a collection of different core network and access network functions, linked by standardized interfaces which, grouped together, can form one IMS administrative network.

The use of peer to peer (P2P) communication can provide significant improvements in delivering streaming media to mobile devices. With the explosive growth of media content consumption, the number of media servers to provide streaming services may increase almost linearly with the number of users. In addition, centralized streaming media servers have considerable demands towards the bandwidth of a backbone IP network. More and more edge servers can be deployed close to UEs to provide a desired quality of service (QoS) and/or quality of experience (QoE). Edge servers can handle the requests from locally served UEs and also the requests transferred from neighboring edge servers.

Peer-to-peer technology can be used between edge servers and UEs to reduce the number of edge servers that are needed to be deployed close to UEs. If the capabilities of a mobile device (e.g., UE) permit, the UE can offer spare uplink bandwidth and storage space for streaming data. The streaming data can be uploaded to other requested destinations. Content can be transmitted in a segmented manner, and most of the traffic can be spread across the edge of the network, which can help reduce the storage and bandwidth demands of centralized servers. So system capability can be improved with P2P technology, which may increase a number of edge servers and/or UEs acting as P2P servers.

In one embodiment, IMS can include a fixed and mobile convergence core network to provide multimedia services. In addition, IMS can provide an infrastructure for user authentication, registration, service discovery, and multimedia session control. FIG. 1 provides an overview of an IMS based P2P content distribution system 100. In one embodiment, an IMS configured UE 110 can initiate content distribution via a fixed or mobile access network to the IMS CN subsystem 102. An IMS UE can be redirected to the portal 104, which can offer content indexing, browsing and searching functionalities. The content can be stored on content servers, such as a network server 106 for a UE. Content cache servers 108 can be deployed close to the users to accelerate content distribution.

A user profile can be stored in the IMS 100 and capabilities (i.e. processing capabilities, screen size, 3GPP capabilities) of a terminal such as a UE 110 can be stored in a P2P application service (e.g., P2P applications server) with the user's preferences. The UE capabilities can be used to decide whether or not a UE, or a client operating on a UE, is capable of receiving the requested content. Content control can be used to control how the content is distributed in the network and where a UE can get the requested content.

IMS-based peer-to-peer content distribution capabilities can be a functionality that may be applied in third generation partnership project's (3GPP's) IMS-based packet switched streaming service (PSS) (as described in 3GPP technical specification (TS) 26.234 V11.1.0 (2012 September)) and multimedia broadcast and multicast service (MBMS) (as described in 3GPP technical specification (TS) 26.346 V11.3.0 (2012 December)) and such IMS-based streaming and download service functionalities can be applied to integrated multimedia subsystem (IMS) based PSS and multimedia broadcast and multicast service (MBMS) (abbreviated as IMS_PSS_MBMS, as described in 3GPP technical specification (TS) 26.237 V11.0.0 (2012 June)). Some IMS-based peer-to-peer content distribution services can include content on-demand services, live streaming services, or efficient software distribution to a large number of online users.

DASH content can be delivered via the IMS-based peer-to-peer content distribution services. In DASH, a media presentation description (MPD) metadata file can provide information on the structure and different versions of the media content representations stored in the server including different bitrates, frame rates, resolutions, or codec types. In addition, DASH can also specify segment formats. The MPD metadata file can contain information on the initialization and media segments for a media player (e.g., the media player can look at initialization segment to determine a container format and media timing information) to ensure mapping of segments into a media presentation timeline for switching and synchronous presentation with other representations. Based on this MPD metadata information that describes the relation of the segments in forming a media presentation, clients (or client devices) can request the segments using HTTP GET or partial GET methods. The client can fully control the streaming session. For example, the client can manage an on-time request and smooth playout of the sequence of segments, and potentially adjusting bitrates or other attributes (e.g., to react to changes of the device state or the user preferences).

Figure 2:
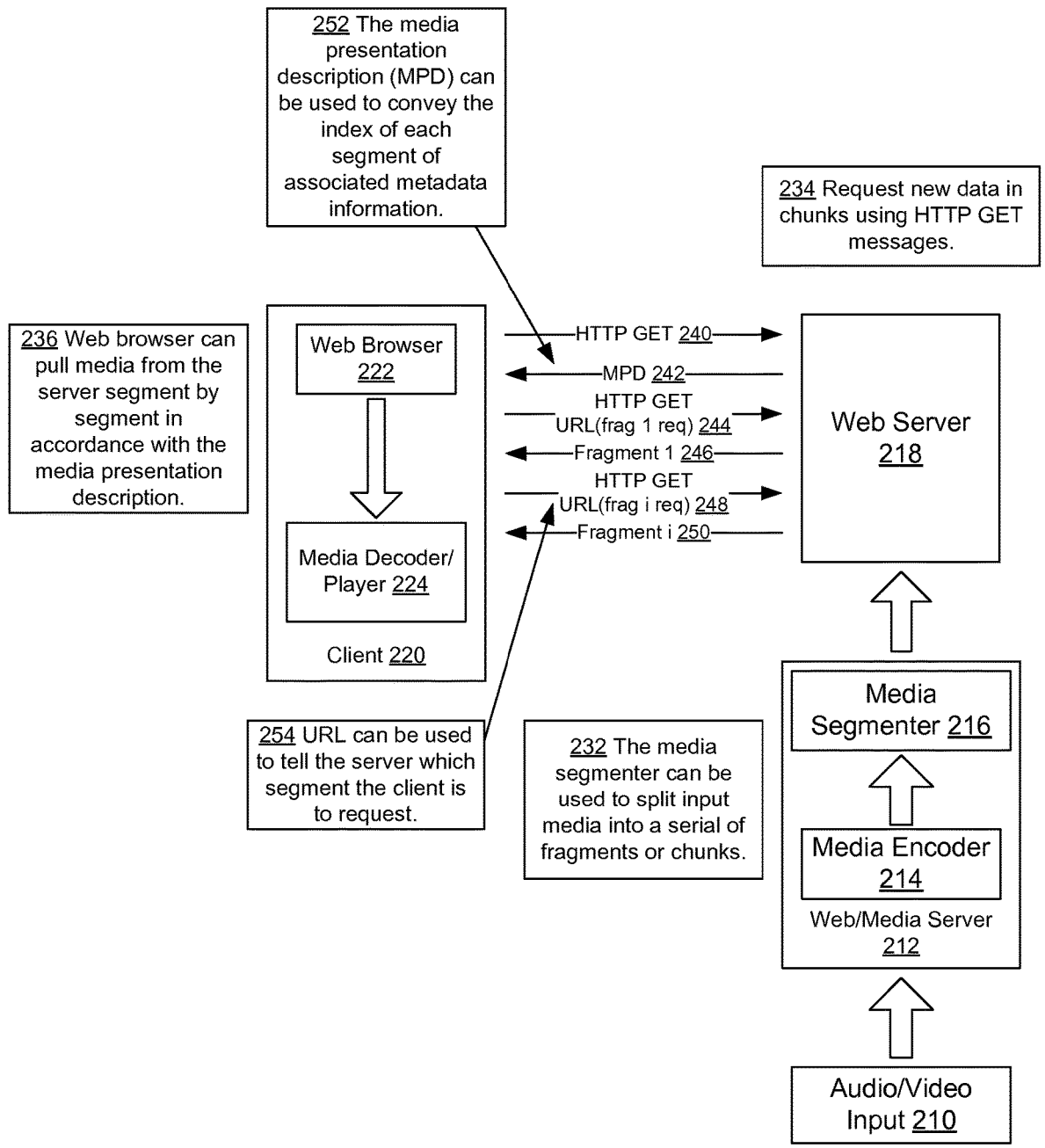
FIG. 2 illustrates a block diagram at a client and servers for dynamic adaptive streaming over hypertext transfer protocol (HTTP) (DASH) in accordance with an example.

In DASH, a media presentation description (MPD) metadata file can provide information on the structure and different versions of the media content representations stored in a web and/or media server 212, as illustrated in FIG. 2. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 220 can request the segments using an HTTP GET 240 message or a series of partial GET messages. The client can control the streaming session, such as managing an on-time request and smooth playout of a sequence of segments, or potentially adjusting bitrates or other attributes, to react to changes of a device state or a user preference.

FIG. 2 illustrates a DASH-based streaming framework. A media encoder 214 in the web/media server 212 can encode an input media from an audio/video input 210 into a format for storage or streaming A media segmenter 216 can be used to split the input media into a serial of fragments or chunks 232, which can be provided to a web server 218. The client 220 can request new data in chunks using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations, as shown in the associated metadata information 252. The web browser can pull media from the server segment by segment in accordance with the MPD 242 as shown in 236. For instance, the web browser can request a first fragment using a HTTP GET URL (frag 1 req) 244. A uniform resource locator (URL) or universal resource locator can be used to tell the web server which segment the client is to request 254. The web server can provide the first fragment (i.e., fragment 1 246). For subsequent fragments, the web browser can request a fragment i using a HTTP GET URL (frag i req) 248, where i is an integer index of the fragment. As a result, the web server can provide a fragment i 250. The fragments can be presented to the client via a media decoder and/or player 224.

Figure 3:
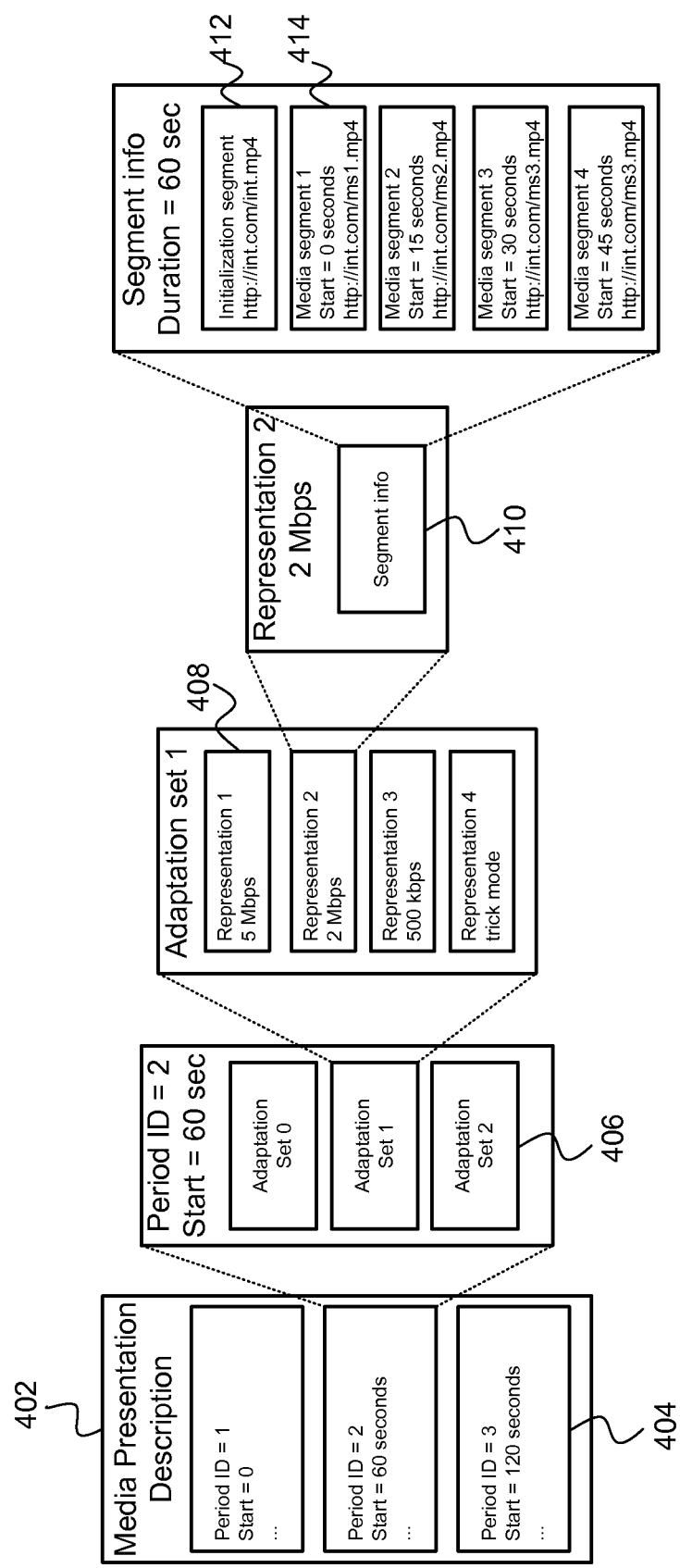
FIG. 3 illustrates a block diagram of a media presentation description (MPD) metadata file configuration in accordance with an example.

As illustrated in FIG. 3, DASH can specify different formats for a media presentation description (MPD) metadata file 402 that provides information on the structure and different versions of the media content representations stored in the server as well as the segment formats (or fragment formats). In DASH, a media presentation description (MPD) metadata 402 can provide information on the structure and different versions of the media content representations stored in a web and/or media server. In the example illustrated in FIG. 3, the MPD metadata can be temporally divided into periods 404 having a predetermined length, such as 60 seconds in this example. Each period can include a plurality of adaptation sets 406. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set can be referred to as representations 408.

In FIG. 3, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video, or portrait or landscape oriented video. Each representation 408 can include segment information 410. The segment information can include initialization information 412 and the actual media segment data 414. In this example, an MPEG-4 (MP4) file is streamed from a server to a mobile device. While MP4 is used in this example, a wide variety of different codecs may be used. A codec is a device, application, element, or computer program capable of encoding or decoding a digital data stream or signal.

The multimedia in the adaptation set can be further divided into smaller segments. In the example of FIG. 3, the 60 second video segment of adaptation set 1 is further divided into four sub-segments 414 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

DASH content can be distributed using multimedia broadcast multicast services (MBMS). MBMS is a point-to-multipoint interface specification for cellular networks, which can provide efficient delivery of broadcast and multicast services, both within a cell as well as within a core network. Enhanced multimedia broadcast and multicast services (eMBMS) can be an LTE version of MBMS, which may be deployed on LTE networks. LTE's eMBMS can provide transport features for sending a same content information to all the users in a cell (i.e., broadcast) or to a given set of users (subscribers) in a cell (i.e., multicast) using a subset of the available radio resources while the remaining available radio resources can be used to support transmissions towards a particular user (e.g., unicast services).

Deployments of eMBMS can enhance the performance and usability of core MBMS user service features. MBMS download delivery can be a service alternative for offloading HTTP-based unicast download delivery. Benefits can include enabling support for non-real-time service types, provisioning of contents that complement MBMS streaming services, and leveraging the increasing storage capacity on devices (e.g., servers). The DASH segment format, which can also be used for unicast transport with HTTP, can be agnostic of the delivery environment being unicast or multicast. The MBMS user service specification (e.g., 3GPP TS 26.346) may allow DASH-formatted content to be transmitted using MBMS download delivery with the file over unidirectional transport (FLUTE) protocol.

FLUTE can be a protocol for the unidirectional delivery of files over the Internet, which can be particularly suited to multicast networks. FLUTE can build on asynchronous layered coding (ALC), a base protocol designed for massively scalable multicast distribution. FLUTE can provide instantiation of a layered coding transport (LCT) building block. The ALC protocol can combine the LCT building block, a congestion control (CC) building block and a forward error correction (FEC) building block to provide congestion controlled reliable asynchronous delivery. The LCT can provide transport level support for reliable content delivery and stream delivery protocols. Streaming data or downloads can be encapsulated in real-time transport protocol (RTP) and transported using the FLUTE protocol when delivering over MBMS bearers. RTP can be used in communication and entertainment systems that involve streaming media, such as telephony, video teleconference applications, television services and web-based push-to-talk features.

Figure 4:
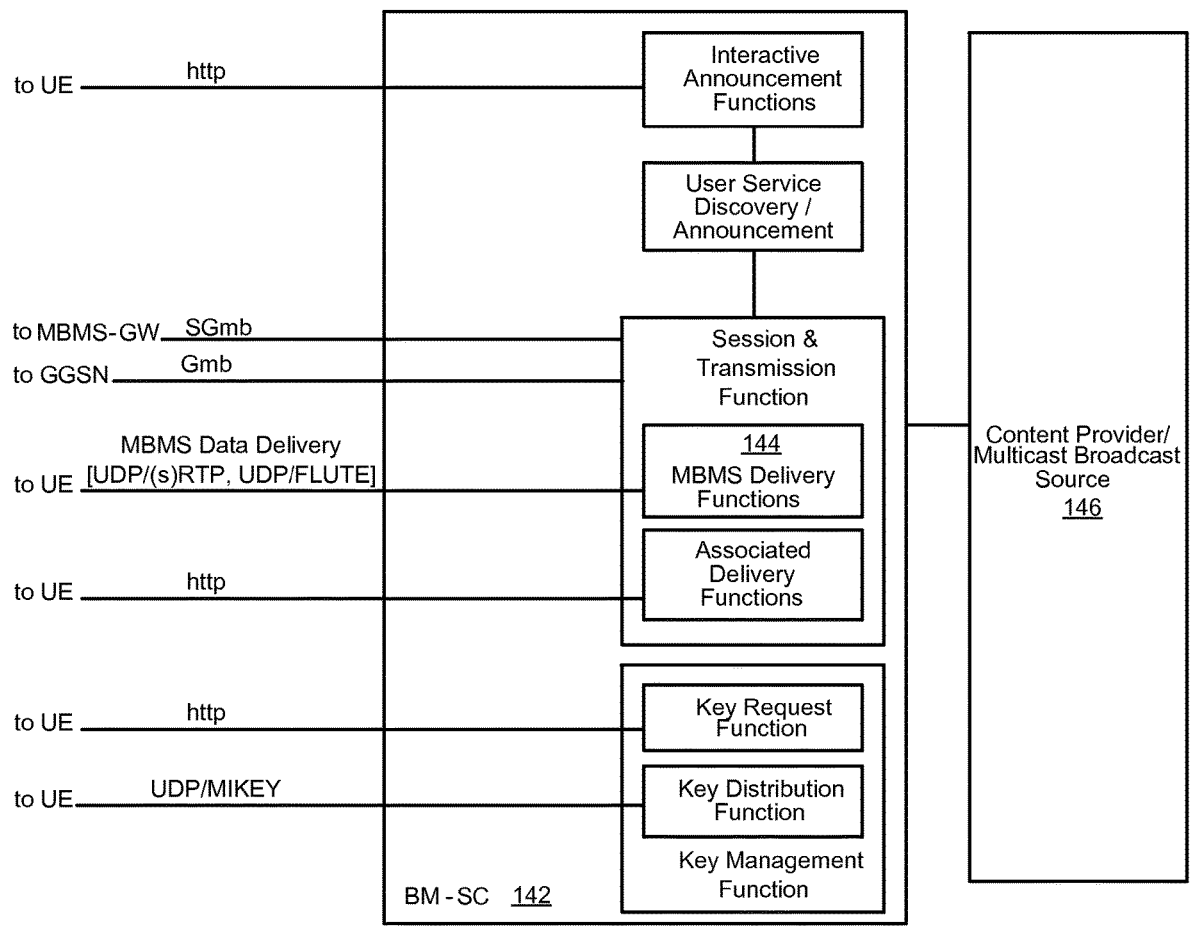
FIG. 4 illustrates a block diagram of a broadcast multicast service center (BMSC) user plane sub-functions (UPF) (BMSC.UPF) for multimedia broadcast multicast services (MBMS) user services in accordance with an example.

FIG. 4 depicts a functional architecture and operation of a broadcast multicast services center (BM-SC) 142 that can host MBMS-based user services for DASH-formatted content delivery. FIG. 4 illustrates the BMSC (BM-SC) sub-functional architecture and associated interfaces between the UE and BMSC. The BM-SC can be in communication with and/or control a content provider/multicast broadcast source 146. The BM-SC can provide various functions including interactive announcement functions, a user service discovery and/or announcement, a session and transmission function, and a key management function. The session and transmission function can provide the MBMS delivery functions 144 and associated delivery functions, and the key management function can provide a key request function and a key distribution function. The BM-SC can communicate with the UE via HTTP (http), user datagram protocol (UDP), real-time transport protocol (RTP), FLUTE, and/or Multimedia Internet KEYing (MIKEY) protocol. The BM-SC can communicate with the MBMS gateway (MBMS-GW) via the SGmb interface, and the BM-SC can communicate with the gateway general packet radio service (GPRS) support node (GGSN) via the Gmb interface.

The technology (e.g., P2P applications server, session control function (SCF), IM CN subsystem, client devices or terminals, user equipments (UEs), methods, computer circuitry, systems, mechanisms, processes, or procedures) described herein can support peer-to-peer (P2P) content distribution over IMS networks. P2P content delivery may be conducted over various streaming and download protocols and formats, including: HTTP-based download delivery (e.g., of a 3GPP file format (3GP) file) from one UE to another UE; HTTP-based adaptive streaming (e.g., using DASH) in scenarios when the sending UE has DASH-formatted content with possibly different representations (e.g., quality levels, bitrates, codecs, and so forth); and FLUTE-based IP multicasting in scenarios of delivery from a sending UE to multiple receiving UEs. For live HTTP-based adaptive streaming (e.g., using DASH) of user-generated contents (UGC), the UE may adaptively capture and/or encode content in DASH format towards ensuring reliable delivery by the receiving UE(s). For live FLUTE-based IP streaming of user-generated contents (UGC), the UE may adaptively capture and/or encode content towards ensuring reliable delivery by the receiving UE(s).

Figure 5:
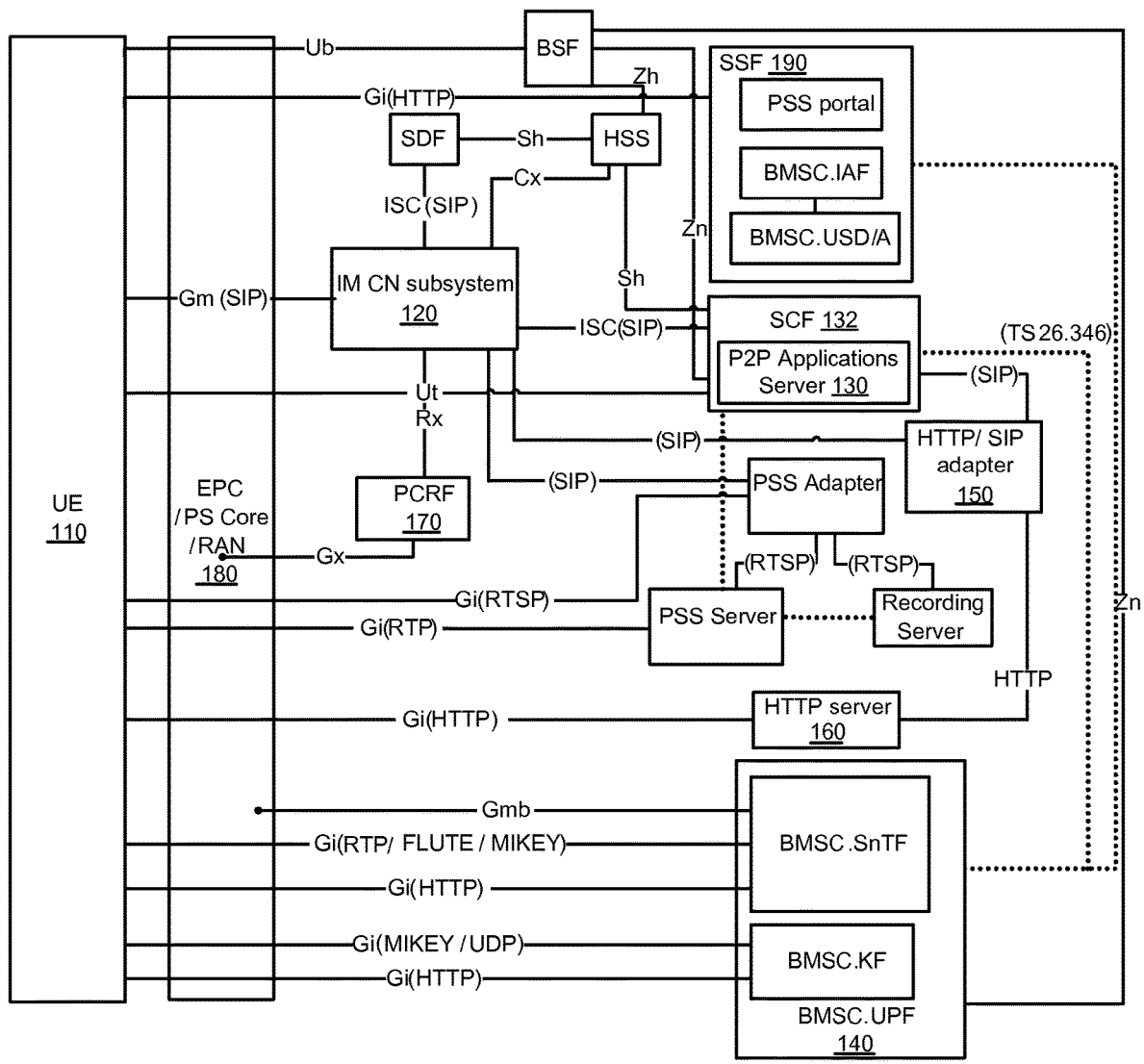
FIG. 5 illustrates a block diagram of an Internet protocol (IP) multimedia subsystem (IMS) based packet-switched streaming services (PSS) and multimedia broadcast multicast services (MBMS) functional architecture with a peer-to-peer (P2P) applications server in accordance with an example.

In an example, P2P content distribution can be implemented in an IMS based packet-switched streaming services (PSS) and MBMS user service functional architecture using a P2P applications server 130, as illustrated in FIG. 5. Greater detail of P2P applications server functionality is provided later. In another example, P2P applications server functionality may be hosted in the session control function (SCF). The SCF can provide service logic and functions to support the execution of service logic. For instance, the SCF can provide service authorization during session initiation and session modification, which can include checking the PSS and the MBMS user's service subscription in order to allow or deny access to the service. The SCF can select the relevant PSS and MBMS media functions. For HTTP-based delivery, the SCF can act as a proxy or back-to-back user agent (B2BUA). For MBMS, the SCF can act as a terminating user agent (UA).

Various functional blocks or modules can be used for IMS-based peer-to-peer content distribution services. For example, an IMS core network subsystem (IM CN subsystem) 120 can support user registration and authentication, mobility and roaming, control of multimedia sessions, quality of service (QoS) control, policy control, charging, and interworking with circuit switched network. The functions of the IM CN subsystem can be further described in 3GPP TS 23.228 V11.7.0 (2012 December).

The user equipment (UE) 110 can contain the generic bootstrapping architecture (GBA), IMS, PSS, and/or MBMS clients, which can perform service discovery and selection, handle service initiation, modification and termination, and/or receive and present the content to the user. In an example, the UE 110 may also host the HTTP/SIP adapter 150, the HTTP server 160, and the BMSC.UPF 140.

An HTTP/SIP adapter 150 function can correlate a session initiation protocol (SIP) session with HTTP incoming requests. The HTTP/SIP adapter can interface with the IM CN subsystem 120, the SCF 132, and a HTTP server 160. The HTTP server can provide the DASH formatted content for the HTTP-based delivery. The functions of the HTTP server can be further described in 3GPP TS 26.247.

A BMSC.UPF 140 can include broadcast multicast service center (BMSC) user plane sub-functions (UPF). The BMSC.UPF can provide the DASH formatted content for the MBMS download. The BMSC.UPF (or BM-SC.UPF or BM-SC (142 of FIG. 4)) can be in communication with and/or control a content provider/multicast broadcast source (146 of FIG. 4). The functions of the BMSC or BMSC.UPF can be further described in 3GPP TS 26.246 V11.3.0 (2012 December).

A policy and charging rules function (PCRF) 170 can control the charging and the establishment of resources in the RAN and packet-switched (PS) core network 180. The functions of the PCRF can be further described in 3GPP TS 23.203 V11.8.0 (2012 December).

A service selection function (SSF) 190 can provide a list of available PSS (including HTTP-based DASH) and MBMS user services and relevant user service description information. The SSF module can be personalized to the client's identity.

A P2P IMS service may use the IMS based PSS and MBMS user service functional architecture. For example, the sending UE may host some of the P2P server functions (e.g., support HTTP, HTTP/SIP adapter, and BMSC/FLUTE server functions). The P2P IMS service can manage UGC traffic in a centralized manner. For example, a P2P applications server 130 (i.e., outside the UE) can perform HTTP server 160, HTTP/SIP adapter 150, and BMSC/FLUTE server 140 functions, where the sending UE may upload the contents and/or associated metadata (e.g., media presentation description (MPD) for DASH or user service description (USD) for MBMS) to the P2P applications server. For instance, the UE 110 may include a HTTP server/client, a SIP client, and a HTTP/SIP adapter that coordinates between the HTTP server/client and SIP client. The P2P applications server can then perform transcoding, repackaging (e.g., DASH-formatting), segmentation, FLUTE-based delivery, and so forth.

In another configuration, a P2P applications server 130 can act as a session initiation protocol (SIP) back-to-back user agent (B2BUA) for establishing a peer-to-peer content delivery session between two UEs and negotiating the P2P session parameters. For instance, the P2P applications server can receive and process metadata involved for HTTP-based download delivery, HTTP-based adaptive streaming (e.g., media presentation description or MPD), and FLUTE-based IP multicasting (e.g., MBMS user service description or USD). The P2P applications server can manage and control the IMS-based P2P sessions (e.g., through session management via session description protocol (SDP)) and also generate new metadata for P2P content delivery (e.g., through modifications on the MPD or the USD).

In another example, the P2P applications server 130 may host P2P content distribution services and conduct service authorization and peer selection during session initiation and session modification, which may include verification of user's P2P service subscription in order to allow or deny access to the content distribution service. In another configuration, IMS-based P2P sharing may involve sharing of metadata (e.g., the MPD for DASH or the USD for MBMS) rather than the actual media. For instance, upon reception of the metadata, the receiving UE may establish a session with the server hosting the corresponding service (e.g., DASH-based streaming or MBMS-based delivery services) to fetch the corresponding media contents. The P2P sharing of only metadata may be applicable to content hosted in the network rather than user generated content (UGC). For this example, the role of the P2P applications server can use SIP-based session control mechanisms to establish the P2P sharing of the relevant metadata between two UEs.

Figure 6:
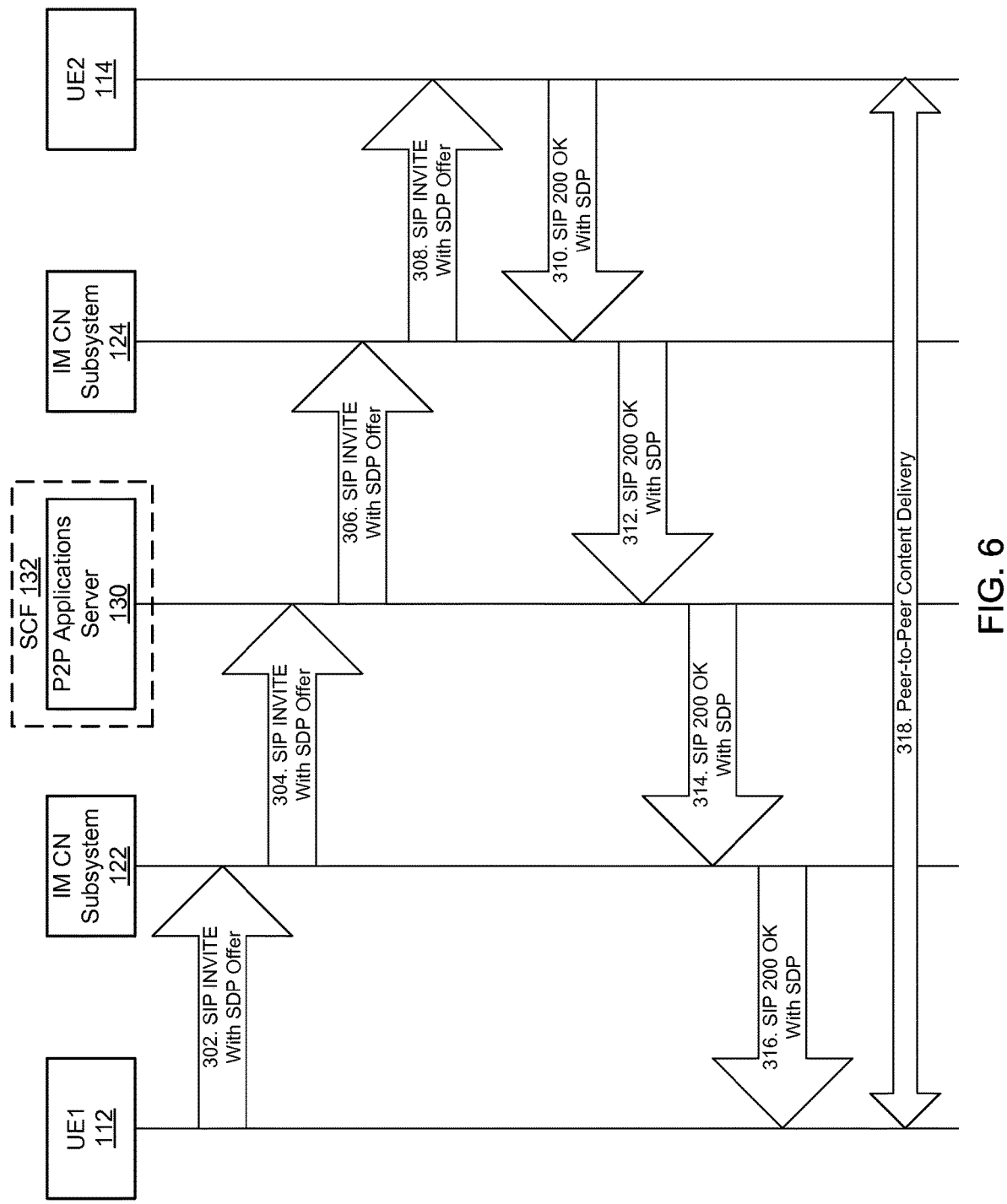
FIG. 6 illustrates an example of a message flow chart of a session initiation protocol (SIP) based session control mechanism for establishing Internet protocol (IP) multimedia subsystem (IMS) based peer-to-peer (P2P) content distribution in accordance with an example.

Various processes can be used for P2P sharing, such as IMS-based P2P streaming and/or content and/or service metadata sharing. FIG. 6 illustrates a SIP-based session control mechanism for establishing IMS-based P2P content distribution using the IMS based PSS and MBMS user service functional architecture. UE1 112 can communicate with the P2P applications server 130 (or SCF 132) via an IM CN subsystem 122 and UE2 114 can communicate with the P2P applications server (or SCF) via an IM CN subsystem 124. The UE1 can host an HTTP client, a SIP client, and an HTTP/SIP adapter. The UE2 can host an HTTP server, a SIP client, and an HTTP/SIP adapter. The SCF can act as a SIP B2BUA (e.g., communicating with the SIP clients in UE1 and UE2) to establish a P2P content delivery session between UE1 and UE2 and negotiate the SDP for the P2P session. The SCF can also verify the user subscription for the P2P service and user rights to the requested content.

For example, UE1 112 can initiate a SIP P2P session with UE2 114, by sending a SIP INVITE message 302 with a SDP offer to the IM CN subsystem 122, which can forward the SIP INVITE 304 to the SCF 132. The SCF can send the SIP INVITE message 306 with the SDP offer to the IM CN subsystem 124, which can forward the SIP INVITE 308 to UE2. UE2 can respond with a SIP 200 OK message 310 with the SDP to the IM CN subsystem 124, which can forward the SIP 200 OK 312 to the SCF. The SCF can send the SIP 200 OK 314 with the SDP to the IM CN subsystem 122, which can forward the SIP 200 OK 316 to UE1. Upon receipt of the SDP, the UE1 can receive P2P content delivery 318 from UE2.

For DASH-based P2P streaming, UE1 may initially establish a SIP session (e.g., SIP INVITE or RE-INVITE) to fetch the MPD from UE2 (e.g., via the SCF), and after successful reception of the MPD, UE1 can update the SIP session and negotiate a new SDP for the delivery of DASH-formatted contents based on the received MPD. In an example, the UE1 can update the SIP session using signaling similar to the sequence depicted in FIG. 6, where SIP RE-INVITE or SIP UPDATE messages are used rather than SIP INVITE.

For IMS-based content and/or service metadata sharing, the peer-to-peer delivery can include delivery of an MPD (for DASH content delivery to UE1), or delivery of a USD (for MBMS service delivery to UE1). In this case, the UE2 can share the details of the DASH/MBMS service with UE1 so that UE1 can access the same service and/or content as UE2.

The P2P IMS service may also be used for IMS-based P2P multicast streaming. For example, UE1 can host BM-SC based server functionality and a SIP client. Including the BM-SC functionality in UE1 can increase the complexity of the UE or home gateway. UE2 can host an MBMS client and a SIP client. The SCF can act as a SIP B2BUA (e.g., communicating with the SIP clients in UE1 and UE2) to establish the P2P content delivery session based on a multicast protocol (e.g., FLUTE and IP multicast) between UE1 and UE2 and negotiate the SDP for the P2P multicast session. The SCF can also verify the user subscription for P2P service and user rights to the requested content. The SIP signaling can be similar to the sequence depicted in FIG. 6. Over the established MBMS session over IMS (e.g., via FLUTE/IP), UE2 can receive the USD and associated media/data contents from UE1.

Figure 7:
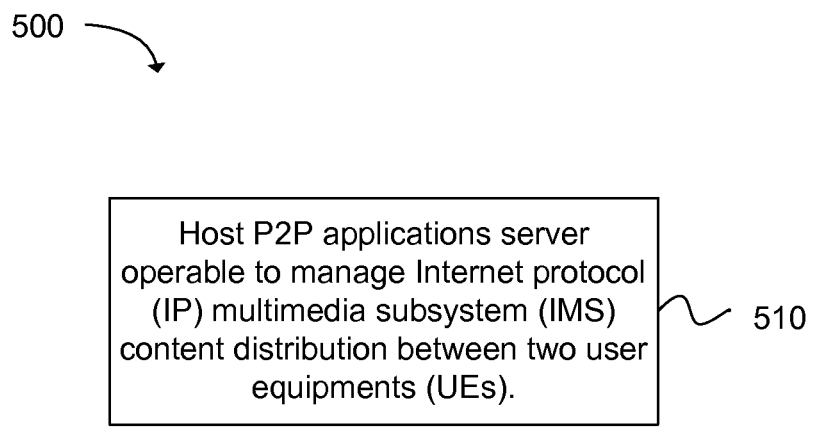
FIG. 7 depicts functionality of computer circuitry of a service control function (SCF) module operable for peer-to-peer (P2P) content distribution in accordance with an example.

Another example provides functionality 500 of computer circuitry of a service control function (SCF) module operable for peer-to-peer (P2P) content distribution, as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to host P2P applications server operable to manage Internet protocol (IP) multimedia subsystem (IMS) content distribution between two user equipments (UEs), as in block 510.

In an example, the computer circuitry configured to host the P2P applications server can be further configured to: manage hypertext transfer protocol-based (HTTP-based) download delivery between two UEs; manage dynamic adaptive streaming over HTTP (DASH) stream between two UEs; or manage file delivery over unidirectional transport-based (FLUTE-based) Internet protocol (IP) multicast from a sending UE to multiple receiving UEs. The HTTP-based download delivery can include a third generation partnership project (3GPP) file format (3GP) file. The DASH stream can include a media presentation description (MPD) metadata file or DASH-formatted content with different representations. The FLUTE-based IP multicasting can include asynchronous layered coding (ALC), a layered coding transport (LCT) building block, or a user service description (USD) file.

In another example, the computer circuitry configured to host the P2P applications server can be further configured to: transcode P2P content; repackage the P2P content; dynamic adaptive streaming over hypertext transfer protocol (HTTP) format (DASH-format) the P2P content; segment the P2P content; or provide file delivery over unidirectional transport-based (FLUTE-based) delivery of the P2P content. The computer circuitry configured to host the P2P applications server can be further configured to: host a session initiation protocol (SIP) back-to-back user agent (B2BUA); establish a P2P content delivery session between the two UEs via the SIP B2BUA; negotiate a P2P session parameter between the two UEs via the SIP B2BUA; manage the P2P content delivery session via a session description protocol (SDP); or generate new metadata for P2P content delivery via modifications of a media presentation description (MPD) metadata file or a user service description (USD) file.

In another configuration, the computer circuitry configured to host the P2P applications server can be further configured to: host P2P content distribution services; perform service authorization and peer selection during a P2P session initiation and a P2P session modification; verify a user subscription for a P2P service; or verify user rights to requested content from a sending UE. The computer circuitry configured to host the P2P applications server can be further configured to: share content metadata between the two UEs, where the content metadata includes a media presentation description (MPD) metadata file for dynamic adaptive streaming over hypertext transfer protocol (HTTP) (DASH) or a user service description (USD) file for a multimedia broadcast multicast services (MBMS); and control a P2P session between the two UEs via a session initiation protocol-based (SIP-based) control mechanism.

Figure 8:
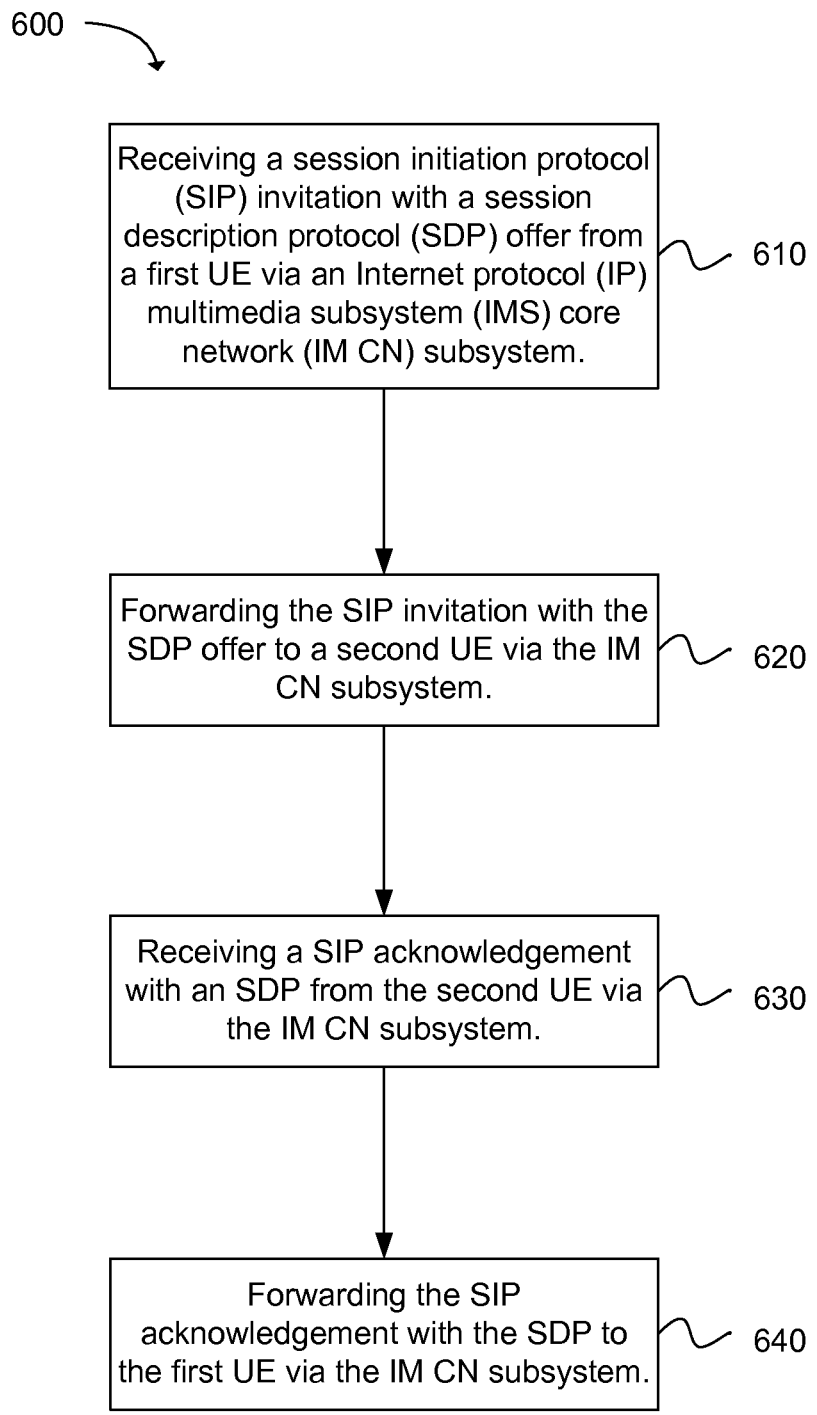
FIG. 8 depicts a flow chart of a method for providing peer-to-peer (P2P) content distribution via a P2P applications server in accordance with an example.

Another example provides a method 600 for providing peer-to-peer (P2P) content distribution via a P2P applications server, as shown in the flow chart in FIG. 8. The method may be executed as instructions on a machine or computer circuitry, where the instructions are included on at least one computer readable medium or one non-transitory machine readable storage medium. The method includes the operation of receiving a session initiation protocol (SIP) invitation with a session description protocol (SDP) offer from a first UE via an Internet protocol (IP) multimedia subsystem (IMS) core network (IM CN) subsystem, as in block 610. The operation of forwarding the SIP invitation with the SDP offer to a second UE via the IM CN subsystem follows, as in block 620. The next operation of the method can be receiving a SIP acknowledgement with an SDP from the second UE via the IM CN subsystem, as in block 630. The method can further include forwarding the SIP acknowledgement with the SDP to the first UE via the IM CN subsystem, as in block 640.

In an example, the method can further include: managing hypertext transfer protocol-based (HTTP-based) download delivery between the first UE and the second UE; managing dynamic adaptive streaming over HTTP (DASH) stream between the first UE and the second UE; or managing file delivery over unidirectional transport-based (FLUTE-based) Internet protocol (IP) multicast from a sending UE to multiple receiving UEs. The HTTP-based download delivery can include a third generation partnership project (3GPP) file format (3GP) file. The DASH stream can include a media presentation description (MPD) metadata file or DASH-formatted content with different representations. The FLUTE-based IP multicasting includes asynchronous layered coding (ALC), a layered coding transport (LCT) building block, or a user service description (USD) file.

In another example, the method can further include: transcoding P2P content; repackaging the P2P content; dynamic adaptive streaming over hypertext transfer protocol (HTTP) formatting (DASH-formatting) the P2P content; segmenting the P2P content; or file delivery over unidirectional transport-based (FLUTE-based) delivering of the P2P content. The method can further include: hosting a session initiation protocol (SIP) back-to-back user agent (B2BUA); establishing a P2P content delivery session between the two UEs via the SIP B2BUA; negotiating a P2P session parameter between the two UEs via the SIP B2BUA; managing the P2P content delivery session via a session description protocol (SDP); or generating new metadata for P2P content delivery via modifications of a media presentation description (MPD) metadata file or a user service description (USD) file.

In another configuration, the method can further include: hosting P2P content distribution services; performing service authorization and peer selection during a P2P session initiation and a P2P session modification; verifying user's P2P service subscription; verifying user rights to requested content; or allowing or denying access to a P2P service. The method can further include: forwarding content metadata from the first UE to the second UE, where the content metadata includes a media presentation description (MPD) metadata file for dynamic adaptive streaming over hypertext transfer protocol (HTTP) (DASH) or a user service description (USD) file for a multimedia broadcast multicast services (MBMS); and controlling a P2P session via a session initiation protocol-based (SIP-based) control mechanism. The P2P applications server is included in a service control function (SCF).

Figure 9:
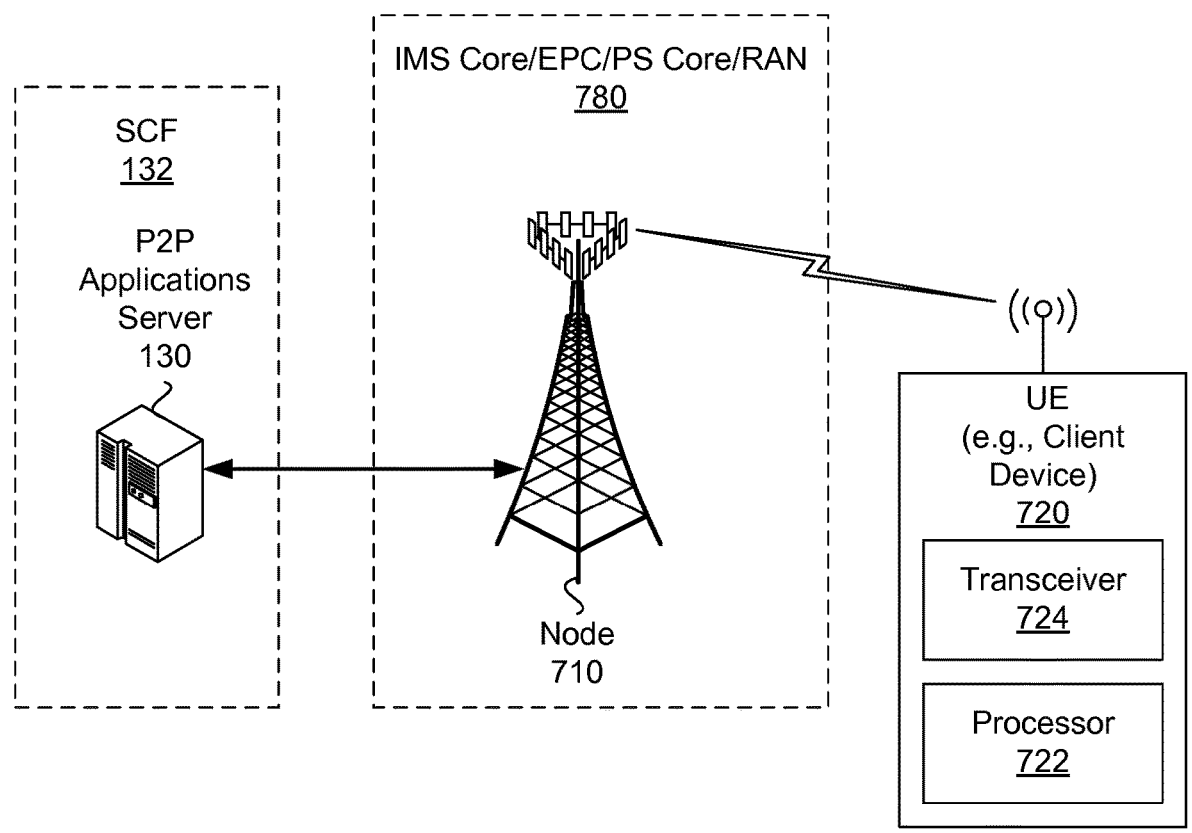
FIG. 9 illustrates a diagram of a peer-to-peer (P2P) application server, a node (e.g., eNB), and a user equipment (UE) in accordance with an example.

FIG. 9 illustrates an example user equipment (UE) 720, a node 710 in a IMS core, EPC, PS core, and/or RAN 780, and a P2P applications server 130 (or SCF 132) for providing P2P content distribution. For example, the SCF can be operable for P2P content distribution, as described in 500 of FIG. 7. In another configuration, the P2P applications server can be configured for providing P2P content distribution, as described in 600 of FIG. 8. In an example, the UE can communicate with the SCF or P2P applications server via the node. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

The UE 720 (e.g, client device) can include a processor 722 and a transceiver 724. The UE can be configured for P2P content distribution. The processor can be configured to: host a session initiation protocol (SIP) client and a hypertext transfer protocol/SIP (HTTP/SIP) adapter for Internet protocol (IP) multimedia subsystem-based (IMS-based) P2P streaming or content metadata sharing; or host a session initiation protocol (SIP) client and a multimedia broadcast multicast services (MBMS) client for IMS-based P2P multicast streaming. The transceiver can be configured to: receive P2P content delivery session parameters from a P2P applications server in a service control function (SCF).

In an example for IMS-based P2P streaming or content metadata sharing, the processor can be further configured to: host an HTTP client; and establish a SIP session. The transceiver can be further configured to: receive a media presentation description (MPD) metadata file from another UE; and receive DASH-formatted contents from the other UE via a session description protocol (SDP) based on the MPD metadata file. The DASH-formatted contents can be controlled via the P2P applications server.

In another example for IMS-based P2P streaming or content metadata sharing, the processor can be further configured to: host an HTTP server; and establish a SIP session. The transceiver can be further configured to: transmit a media presentation description (MPD) metadata file to another UE; and transmit DASH-formatted contents to the other UE via a session description protocol (SDP) based on the MPD metadata file. The DASH-formatted contents can be controlled via the P2P applications server.

In another configuration for IMS-based P2P streaming or content metadata sharing, the processor can be further configured to establish a SIP session. The transceiver can be further configured to receive a user service description (USD) file and associated data contents in a P2P multicast stream from another UE. The P2P multicast stream can be controlled via the P2P applications server. In another example, the processor can be further configured to: host a broadcast multicast service center user plane sub-function (BMSC.UPF) or a file delivery over unidirectional transport (FLUTE) server; and establish a SIP session. The transceiver can be further configured to upload a user service description (USD) file and associated data contents in a P2P multicast stream to another UE. The P2P multicast stream can be controlled via the P2P applications server.

In another example, the transceiver can be further configured to: receive a hypertext transfer protocol-based (HTTP-based) download from another UE; receive a dynamic adaptive streaming over HTTP (DASH) stream from the other UE; receive a file over unidirectional transport-based (FLUTE-based) Internet protocol (IP) multicast from a sending UE; transmit a HTTP-based upload to the other UE; upload a DASH stream to the other UE; or deliver a FLUTE-based IP multicast to multiple receiving UEs. The HTTP-based download delivery can include a third generation partnership project (3GPP) file format (3GP) file. The DASH stream can include a media presentation description (MPD) metadata file or DASH-formatted content with different representations. The FLUTE-based IP multicasting can include asynchronous layered coding (ALC), a layered coding transport (LCT) building block, or a user service description (USD) file.

In another configuration, the processor can be further configured to: capture user-generated contents (UGC); and encode the UGC in a dynamic adaptive streaming over hypertext transfer protocol (HTTP) (DASH) format or in a multimedia broadcast multicast services (MBMS) format. The transceiver can be further configured to upload the UGC to another UE via a P2P applications server in a service control function (SCF).

Figure 10:
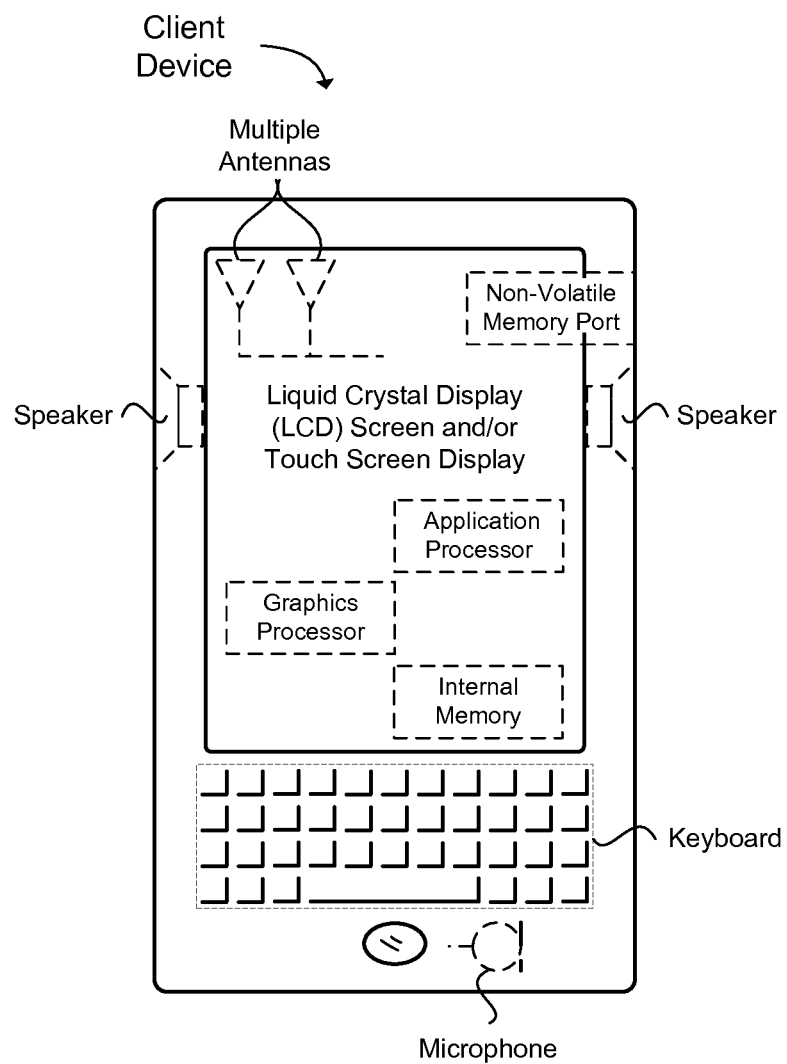
FIG. 10 illustrates a diagram of a wireless device (e.g., UE) in accordance with an example.

FIG. 10 provides an example illustration of the user equipment (UE), such as a mobile terminal (MT), a mobile node, a client device, a mobile station (MS), a mobile wireless device, a mobile communication device, a tablet, a handset, or other type of wireless device. The UE can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the UE. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for providing peer-to-peer (P2P) content distribution via a P2P applications server, comprising:
   receiving, at the P2P applications server, a first session initiation protocol (SIP) invitation with a session description protocol (SDP) offer from a first UE via an Internet protocol (IP) multimedia subsystem (IMS) core network (IM CN) subsystem;
   forwarding, from the P2P applications server, the first SIP invitation with the SDP offer to a second UE via the IM CN subsystem;
   receiving, at the P2P applications server, a SIP acknowledgement with an SDP from the second UE via the IM CN subsystem;
   forwarding, from the P2P applications server, the SIP acknowledgement with the SDP to the first UE via the IM CN subsystem;
   verifying, at the P2P applications server, a P2P service subscription for the first UE and user rights to IMS-based P2P content requested by the first UE; and
   managing, at the P2P applications server, an IMS-based P2P content distribution session between the first UE and the second UE that enables a communication of requested IMS-based P2P content from the second UE to the first UE after verifying the P2P service subscription and the user rights of the first UE, wherein the IMS-based P2P content distribution session includes a transcoding, a repackaging and a segmentation of the requested IMS-based P2P content at the P2P applications server, and wherein the managing comprises:
   receiving, at the P2P applications server, a media presentation description (MPD) metadata file from the second UE;
   forwarding, from the P2P applications server, the MPD metadata file to the first UE; and
   receiving, at the P2P applications server, an updated SIP invitation from the first UE, wherein the updated SIP invitation includes a parameter specified by the MPD metadata file from the second UE, and wherein the updated SIP invitation is an updated version of the first SIP invitation.

2. The method of claim 1, further comprising:
   managing hypertext transfer protocol-based (HTTP-based) download delivery between the first UE and the second UE;
   managing dynamic adaptive streaming over HTTP (DASH) stream between the first UE and the second UE; or
   managing file delivery over unidirectional transport-based (FLUTE-based) Internet protocol (IP) multicast from a sending UE to multiple receiving UEs.

3. The method of claim 2, wherein:
   the HTTP-based download delivery includes a third generation partnership project (3GPP) file format (3GP) file;
   the DASH stream includes a media presentation description (MPD) metadata file or DASH-formatted content with different representations; and
   the FLUTE-based IP multicasting includes asynchronous layered coding (ALC), a layered coding transport (LCT) building block, or a user service description (USD) file.

4. The method of claim 1, further comprising:
   dynamic adaptive streaming over hypertext transfer protocol (HTTP) formatting (DASH-formatting) the P2P content; or
   file delivery over unidirectional transport-based (FLUTE-based) delivering of the P2P content.

5. The method of claim 1, further comprising:
   hosting an SIP back-to-back user agent (B2BUA);
   establishing a P2P content delivery session between the two UEs via the SIP B2BUA;
   negotiating a P2P session parameter between the two UEs via the SIP B2BUA; managing the P2P content delivery session via a session description protocol (SDP); or
   generating new metadata for P2P content delivery via modifications of a media presentation description (MPD) metadata file or a user service description (USD) file.

6. The method of claim 1, further comprising:
   hosting P2P content distribution services;
   performing service authorization and peer selection during a P2P session initiation and a P2P session modification; and
   allowing or denying access to a P2P service.

7. The method of claim 1, further comprising:
   forwarding content metadata from the first UE to the second UE, wherein the content metadata includes a media presentation description (MPD) metadata file for dynamic adaptive streaming over hypertext transfer protocol (HTTP) (DASH) or a user service description (USD) file for a multimedia broadcast multicast services (MBMS); and controlling a P2P session via an SIP-based control mechanism.

8. The method of claim 1, wherein the P2P applications server is included in a service control function (SCF).

9. At least one non-transitory machine readable storage medium comprising a plurality of instructions adapted to be executed to implement the method of claim 1.

10. A service control function (SCF) module operable for peer-to-peer (P2P) content distribution, having computer circuitry configured to:
host a P2P applications server operable to:
manage Internet protocol (IP) multimedia subsystem (IMS) content distribution between two user equipments (UEs) that includes a first UE and a second UE;
verify a P2P service subscription for the first UE and user rights to IMS-based P2P content requested by the first UE; and
initiate an IMS-based P2P content distribution session between the first UE and the second UE that enables a communication of requested IMS-based P2P content from the second UE to the first UE after the P2P service subscription and the user rights of the first UE are verified, wherein the IMS-based P2P content distribution session includes a transcoding, a repackaging and a segmentation of the requested IMS-based P2P content at the P2P applications server included in the SCF module, wherein the P2P applications server is further operable to receive a media presentation description (MPD) metadata file from the second UE, forward the MPD metadata file to the first UE, and receive an updated session initiation protocol (SIP) invitation from the first UE, wherein the updated SIP invitation includes a parameter specified by the MPD metadata file from the second UE, and wherein the updated SIP invitation is an updated version of an original SIP invitation of the first UE.

11. The computer circuitry of claim 10, wherein the computer circuitry configured to host the P2P applications server is further configured to:
manage hypertext transfer protocol-based (HTTP-based) download delivery between two UEs;
manage dynamic adaptive streaming over HTTP (DASH) stream between two UEs; or
manage file delivery over unidirectional transport-based (FLUTE-based) Internet protocol (IP) multicast from a sending UE to multiple receiving UEs.

12. The computer circuitry of claim 11, wherein:
the HTTP-based download delivery includes a third generation partnership project (3GPP) file format (3GP) file;
the DASH stream includes the MPD metadata file or DASH-formatted content with different representations; and
the FLUTE-based IP multicasting includes asynchronous layered coding (ALC), a layered coding transport (LCT) building block, or a user service description (USD) file.

13. The computer circuitry of claim 10, wherein the computer circuitry configured to host the P2P applications server is further configured to:
provide dynamic adaptive streaming over hypertext transfer protocol (HTTP) format (DASH-format) the P2P content; or
provide file delivery over unidirectional transport-based (FLUTE-based) delivery of the P2P content.

14. The computer circuitry of claim 10, wherein the computer circuitry configured to host the P2P applications server is further configured to:
host a session initiation protocol (SIP) back-to-back user agent (B2BUA);
establish a P2P content delivery session between the two UEs via the SIP B2BUA;
negotiate a P2P session parameter between the two UEs via the SIP B2BUA;
manage the P2P content delivery session via a session description protocol (SDP);
or
generate new metadata for P2P content delivery via modifications of the MPD metadata file or a user service description (USD) file.

15. The computer circuitry of claim 10, wherein the computer circuitry configured to host the P2P applications server is further configured to:
host P2P content distribution services; or
perform service authorization and peer selection during a P2P session initiation and a P2P session modification.

16. The computer circuitry of claim 10, wherein the computer circuitry configured to host the P2P applications server is further configured to:
share content metadata between the two UEs, wherein the content metadata includes the MPD metadata file for dynamic adaptive streaming over hypertext transfer protocol (HTTP) (DASH) or a user service description (USD) file for a multimedia broadcast multicast services (MBMS); and
control a P2P session between the two UEs via a session initiation protocol-based (SIP-based) control mechanism.

17. A user equipment (UE) for peer-to-peer (P2P) content distribution, comprising:
a processor to:
host a session initiation protocol (SIP) client and a hypertext transfer protocol/SIP (HTTP/SIP) adapter for Internet protocol (IP) multimedia subsystem-based (IMS-based) P2P streaming or content metadata sharing with a second UE via a P2P applications server in a service control function (SCF); or
host a session initiation protocol (SIP) client and a multimedia broadcast multicast services (MBMS) client for IMS-based P2P multicast streaming with the second UE via the P2P applications server in the SCF,
wherein an IMS-based P2P content distribution session is initiated by the P2P applications server between the UE and the second UE that enables a communication of requested IMS-based P2P content from the second UE to the UE after a P2P service subscription and user rights of the UE are verified, and the requested IMS-based P2P content is transcoded, repackaged and segmented at the P2P applications server during the IMS-based P2P content distribution session, and
wherein the UE is further operable to receive a media presentation description (MPD) metadata file from the second UE via the P2P applications server and transmit an updated SIP invitation to the P2P applications server, wherein the updated SIP invitation includes a parameter specified by the MPD metadata file from the second UE, and wherein the updated SIP invitation is an updated version of an original SIP invitation of the UE; and a transceiver to:
  receive P2P content delivery session parameters from the P2P applications server in the SCF.

18. The UE of claim 17, wherein for IMS-based P2P streaming or content metadata sharing:
  the processor is further configured to:
    host an HTTP client; and
    establish a SIP session; and
  a transceiver to:
    receive the MPD metadata file from the second UE; and
    receive DASH-formatted contents from the second UE via a session description protocol (SDP) based on the MPD metadata file, wherein the DASH-formatted contents are controlled via the P2P applications server.

19. The UE of claim 17, wherein for IMS-based P2P multicast streaming:
  the processor is further configured to: establish a SIP session; and
  a transceiver is configured to:
    receive a user service description (USD) file and associated data contents in a P2P multicast stream from the second UE, wherein the P2P multicast stream is controlled via the P2P applications server.

20. The UE of claim 17, for IMS-based P2P multicast streaming:
  the processor is further configured to:
    host a broadcast multicast service center user plane sub-function (BMSC.UPF) or a file delivery over unidirectional transport (FLUTE) server; and
    establish a SIP session; and
  a transceiver to:
    upload a user service description (USD) file and associated data contents in a P2P multicast stream to the second UE, wherein the P2P multicast stream is controlled via the P2P applications server.

21. The UE of claim 17, further comprising:
  a transceiver to:
    receive a hypertext transfer protocol-based (HTTP-based) download from the second UE;
    receive a dynamic adaptive streaming over HTTP (DASH) stream from the second UE;
    receive a file over unidirectional transport-based (FLUTE-based) Internet protocol (IP) multicast from a sending UE;
    transmit a HTTP-based upload to the second UE;
    upload a DASH stream to the second UE; or
    deliver a FLUTE-based IP multicast to multiple receiving UEs.

22. The UE of claim 21, wherein:
  the HTTP-based download delivery includes a third generation partnership project (3GPP) file format (3GP) file;
  the DASH stream includes the MPD metadata file or DASH-formatted content with different representations; and
  the FLUTE-based IP multicasting includes asynchronous layered coding (ALC), a layered coding transport (LCT) building block, or a user service description (USD) file.

23. The UE of claim 17, wherein:
  the processor is further configured to:
    capture user-generated contents (UGC); and
    encode the UGC in a dynamic adaptive streaming over hypertext transfer protocol (HTTP) (DASH) format or in a multimedia broadcast multicast services (MBMS) format; and
  a transceiver to:
    upload the UGC to the second UE via a P2P applications server in a service control function (SCF).

24. The UE of claim 17, wherein the UE includes an antenna, a camera, a touch sensitive display screen, a speaker, a microphone, a graphics processor, an application processor, internal memory, or a non-volatile memory port.

* * * * *